United States Patent
Pietraski et al.

(10) Patent No.: US 7,496,138 B2
(45) Date of Patent: Feb. 24, 2009

(54) METHOD AND APPARATUS FOR ESTIMATING THE STEP-SIZE OF AN ADAPTIVE EQUALIZER

(75) Inventors: Philip J. Pietraski, Huntington Station, NY (US); Mihaela Beluri, Glen Cove, NY (US); Alpaslan Demir, East Meadow, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 589 days.

(21) Appl. No.: 11/238,469

(22) Filed: Sep. 29, 2005

(65) Prior Publication Data

US 2006/0098766 A1    May 11, 2006

Related U.S. Application Data

(60) Provisional application No. 60/625,869, filed on Nov. 8, 2004.

(51) Int. Cl.
*H03H 7/30* (2006.01)
*H03K 5/159* (2006.01)

(52) U.S. Cl. .................................................. 375/232
(58) Field of Classification Search .......... 375/229–232
See application file for complete search history.

(56) References Cited

U.S. PATENT DOCUMENTS

| 5,818,876 | A | 10/1998 | Love |
| 6,021,161 | A | 2/2000 | Yamaguchi et al. |
| 6,389,084 | B1 | 5/2002 | Rupp |
| 2003/0126170 | A1* | 7/2003 | Ling et al. ................. 708/322 |
| 2005/0129105 | A1 | 6/2005 | Papasakellariou |

* cited by examiner

*Primary Examiner*—David B Lugo
(74) *Attorney, Agent, or Firm*—Volpe and Koenig, P.C.

(57) ABSTRACT

A step-size estimator for controlling the step-size of an adaptive equalizer incorporated in a transceiver, (e.g., a wireless transmit/receive unit (WTRU)). The step-size estimator updates at least one adaptive equalizer tap used by the adaptive equalizer based on an apparent speed of a channel established between the transceiver and another transceiver. The step-size estimator includes a speed estimator, a signal-to-noise ratio (SNR) averager and a step-size mapping unit. The speed estimator is used to estimate the apparent speed of the channel, (i.e., the observed and/or measured rate of change of the channel impulse response). The SNR averager generates a common pilot channel (CPICH) SNR estimate. The step-size mapping unit uses the speed estimate and the CPICH SNR estimate to generate a step-size parameter, $\mu$, and a filter taps leakage factor parameter, $\alpha$, used by the adaptive equalizer to update the filter tap coefficient.

32 Claims, 6 Drawing Sheets

METHOD AND APPARATUS FOR ESTIMATING THE STEP-SIZE OF AN ADAPTIVE EQUALIZER

CROSS REFERENCE TO RELATED APPLICATION

This application claims the benefit of U.S. provisional application No. 60/625,869 filed Nov. 8, 2004, which is incorporated by reference as if fully set forth.

FIELD OF THE INVENTION

The present invention relates to controlling an adaptive equalizer incorporated in a transceiver, such as a wireless transmit/receive unit (WTRU). More particularly, the present invention relates to updating at least one filter tap coefficient used by the adaptive filter based on the apparent speed of a channel, (i.e., the observed and/or measured rate of change of the channel impulse response), established between the transceiver and another transceiver.

BACKGROUND

An adaptive equalizer based receiver, such as a normalized least mean square (NLMS)-based receiver, provides superior performance for high data rate services such as frequency division duplex (FDD) high speed downlink packet access (HSDPA) or code division multiple access (CDMA) 2000 evolution data voice (EV-DV) over a Rake receiver. A typical NLMS receiver includes an adaptive equalizer having an equalizer filter and a tap coefficients generator to generate the tap coefficients used to update the filter coefficients of the equalizer filter. The equalizer filter is typically a finite impulse response (FIR) filter.

An adaptive step-size parameter, $\mu$, ("mu"), in an adaptive equalization algorithm controls the rate of convergence of the equalizer filter. The adaptation step-size parameter $\mu$ is a critical parameter that impacts the performance of the adaptive equalizer. The adaptive step-size parameter $\mu$ is typically defined prior to operation of the equalizer filter or varied in a deterministic way. The step-size is the size of each step in an iterative (loop) algorithm that attempts to converge to some point, such as least mean square (LMS), NLMS or its derivatives. Large step-sizes help the adaptive equalizer converge (in as accurate a manner as is possible) in a short period of time, but the adaptive equalizer would converge more accurately if the step-size was smaller. Thus, there is a trade-off between quick and accurate convergence. The ideal balance between convergence speed and accuracy depends on how fast the point on which the algorithm is trying to converge to is changing. The convergence time is inversely related to the adaptation step-size parameter $\mu$. Therefore, with a larger step-size, the convergence may be obtained quickly.

However, the large step-size may cause misadjustment errors which impact the raw bit error rate (BER) performance of the adaptive equalizer. The misadjustment errors are due to the convergence of the LMS never being fully achieved because the step size used is approximately the closest each point on the vector may come to the desired point.

SUMMARY

The present invention is a step-size estimator for controlling the step-size of an adaptive equalizer incorporated in a transceiver, (e.g., a WTRU). The step-size estimator updates at least one adaptive equalizer tap used by the adaptive equalizer based on an apparent speed of a channel established between the transceiver and another transceiver. The step-size estimator includes a speed estimator, a signal-to-noise ratio (SNR) averager and a step-size mapping unit. The speed estimator is used to estimate the apparent speed of the channel, (i.e., the observed and/or measured rate of change of the channel impulse response). The SNR averager generates a common pilot channel (CPICH) SNR estimate. The step-size mapping unit uses the speed estimate and the CPICH SNR estimate to generate a step-size parameter, $\mu$, and a filter taps leakage factor parameter, $\alpha$, used by the adaptive equalizer to update the filter tap coefficient.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "transceiver" includes but is not limited to a base station, a WTRU, a Node-B, an access point (AP) or any other wireless communication device that receives signals from and transmits signals to another transceiver.

When referred to hereafter, the terminology "apparent channel speed" and "apparent speed of a channel" includes but is not limited to the observed and/or measured rate of change of an impulse response of a channel established between a first transceiver, (e.g., WTRU, base station, or the like), and at least one other transceiver. The change of the channel impulse response may be caused by the movement of one or more of the transceivers, oscillator error which occur in at least one of the transceivers, and the movement of objects in the environment in which at least one of the transceivers operates.

The features of the present invention may be incorporated into an integrated circuit (IC) or be configured in a circuit comprising a multitude of interconnecting components.

The present invention controls the adaptation step-size of an adaptive equalizer. The value of the adaptation step-size $\mu$ depends on the rate of channel change, (such as a Doppler spread which is related to the WTRU velocity), and SNR of the channel. For fast channels, it is preferable to use a larger step-size to allow the adaptive equalizer to track the channel variations quickly. Conversely, for slower channels, a lower step-size is desired to reduce the misadjustment error and thus improve the performance of the adaptive equalizer.

The dependency of the adaptation step-size parameter $\mu$ on the SNR is such that at a high SNR, the value of the adaptation step-size parameter $\mu$ tends to be higher, while at a low SNR, the adaptive step-size parameter $\mu$ is typically small. Additional inputs may also be used as appropriate, (e.g., delay spread and the number of active taps in the equalizer filter). The present invention is used to maintain an ideal balance between the convergence speed and accuracy through the estimation of the apparent channel speed.

Figure 1A:
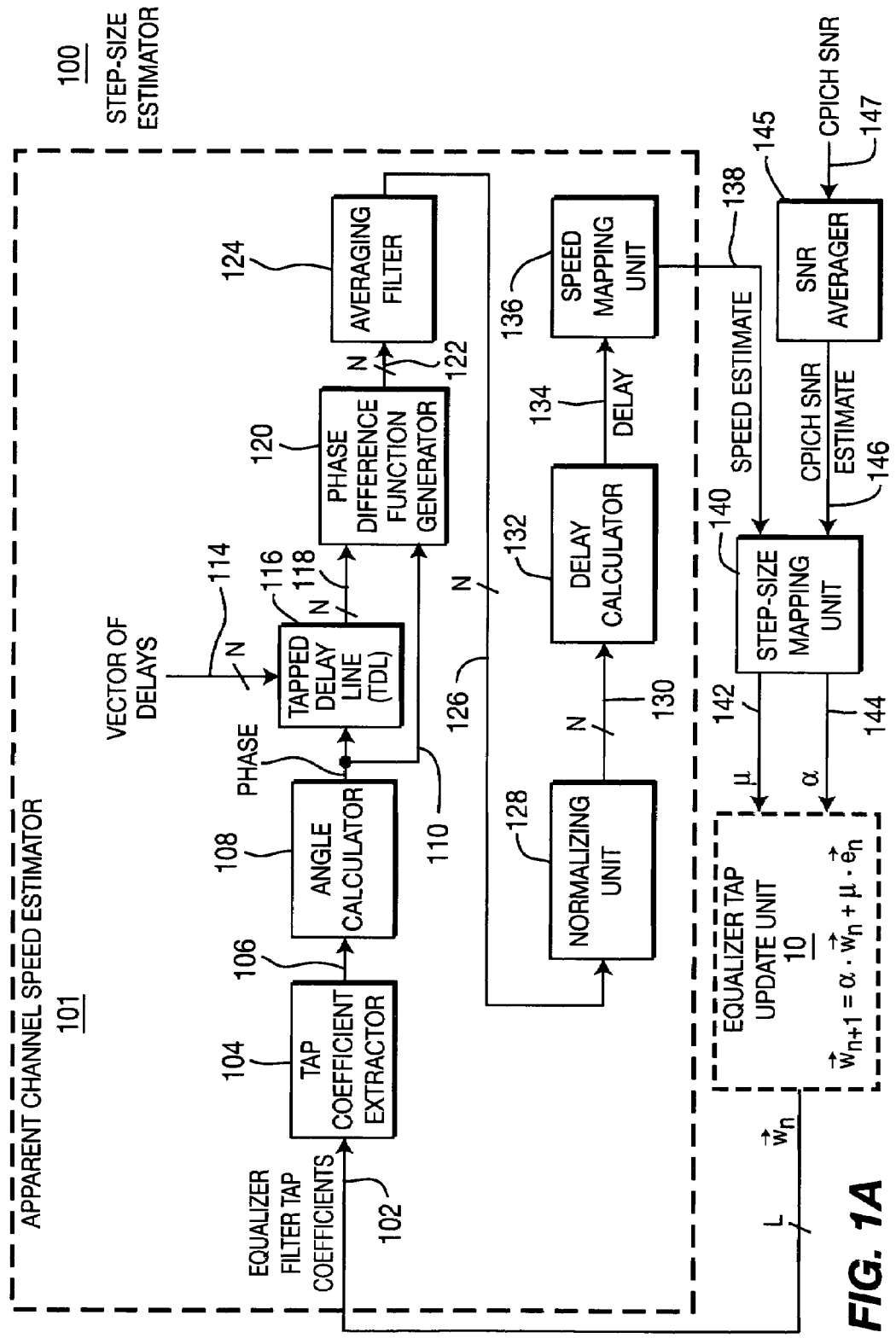
FIG. 1A is a block diagram of an exemplary step-size estimator including an apparent channel speed estimator which is configured in accordance with one embodiment of the present invention.

FIG. 1A is a block diagram of an exemplary step-size estimator 100 which includes an apparent channel speed estimator 101 which is configured in accordance with one embodiment of the present invention.

Figure 1B:
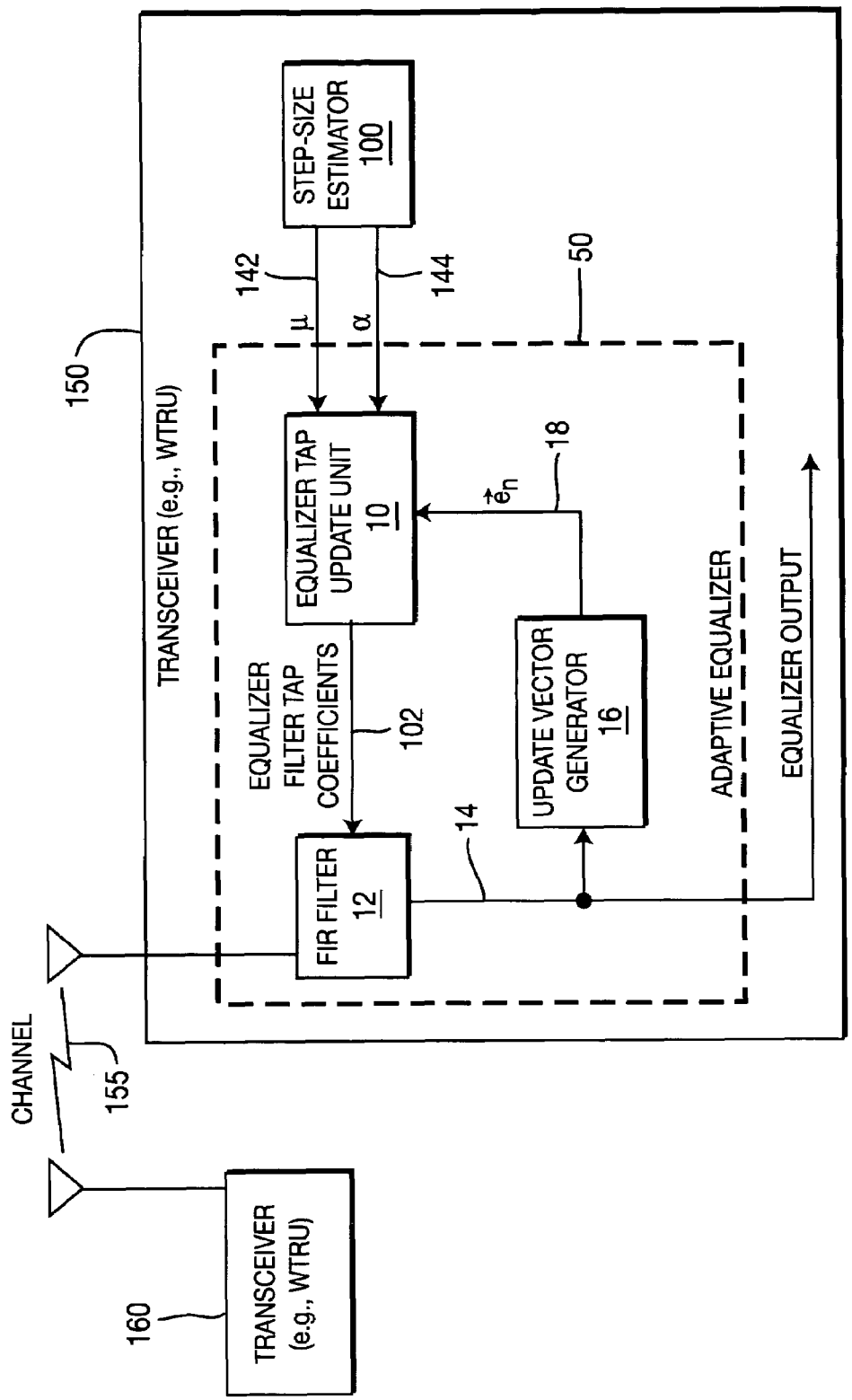
FIG. 1B is a system diagram of a transceiver, which includes the step-size estimator of FIG. 1A, communicating with another transceiver over a channel for which the apparent channel speed estimator performs an apparent channel speed estimate.

Referring to FIG. 1B, the step-size estimator 100 controls the step-size of an adaptive equalizer 50 incorporated in a first transceiver 150. At least one filter tap coefficient 102 used by the adaptive equalizer 50 is updated based on an apparent speed of a channel 155 established between the first transceiver 150 and a second transceiver 160. The adaptive filter 50 includes an equalizer tap update unit 10, a FIR filter 12 and an update vector generator 16. The step-size estimator 100 provides a step-size, $\mu$ ("mu"), parameter 142, and a filter taps leakage factor, $\alpha$ ("alpha"), parameter 144 to the equalizer tap update unit 10. In turn, the equalizer tap update unit 10 generates equalizer filter tap coefficients 102 which are fed to the step-size estimator 100 and the FIR filter 12.

When the second transceiver 160 transmits a signal to the first transceiver 150 over the channel 155, the transmitted signal is corrupted, (or modified), by the channel 155 prior to reaching the FIR filter 12 in the adaptive equalizer 50 of the first transceiver 150. The FIR filter 12 filters the signal and defines a filter impulse response, which is defined by the equalizer filter tap coefficients 102 generated by the equalizer tap update unit 10 after the equalized output 14 of the FIR filter 12 is fed to the update vector generator 16. The update vector generator 16 generates an error signal 18 including a vector $\vec{e}_n$ which is fed to the equalizer tap update unit 10 for updating the equalizer filter tap coefficients 102.

As shown in FIG. 1A, the step-size estimator 100 includes an apparent channel speed estimator 101, a step-size mapping unit 140 and an SNR averager 145. The apparent channel speed estimator 101 estimates the speed of the channel 155 established between a first transceiver 150 which includes the step-size estimator 100, and a second transceiver 160, as shown in FIG. 1B. Equalizer filter tap coefficients 102 are input to the apparent channel speed estimator 101 by an equalizer tap update unit 10. The equalizer filter tap coefficients 102 are complex values that are multiplied with an input sample sequence in the adaptive equalizer 50. The output of the equalizer tap update unit 10 is generated by finding the inner product of two vectors. One vector is a state (output) of a tapped delay line (TDL) within the equalizer tap update unit 10, and the other vector is the vector of equalizer filter tap coefficients 102 (or a conjugate of them) used by the equalizer tap update unit 10.

Referring to FIG. 1A, the apparent channel speed estimator 101 includes a tap coefficient extractor 104, an angle calculator 108, a TDL 116, a phase difference function generator 120, an averaging filter 124, a normalizing unit 128, a delay calculator 132 and a speed mapping unit 136.

In accordance with the present invention, velocity information is extracted from a history of the filter coefficients used by the equalizer tap update unit 10. This procedure is possible because the equalizer tap update unit 10 adaptively estimates a minimum mean square error (MMSE) solution to detect a reference signal such as a pilot signal. In doing so, the resulting equalizer tap update unit 10 is close to an inverse of the channel. A speed estimate may be performed by tracking the rate of change of one or more filter tap values used by the equalizer tap update unit 10 which reflect the rate of change of the channel, (i.e., its apparent speed).

The tap coefficient extractor 104 extracts at least one tap coefficient from equalizer filter tap coefficients 102 received from the equalizer tap update unit 10 and sends the extracted tap coefficient 106 to the angle calculator 108.

A typical channel impulse response can usually be characterized by finite set of (disjoint) delayed and scaled impulses. The location of each of these impulses is referred to as a path, (i.e., a component of a "multi-path" channel). The location and the mean power of each of the paths relative to a first significant tap (FSP) determines the location and magnitude of the equalizer tap weights.

The extracted tap coefficient 106 may be a coefficient that corresponds to an FSP, a most significant path (MSP), an average of several taps, or any other paths. The extracted tap coefficient 106 consists of complex numbers, and thus has an amplitude and a phase, (or equivalently, an angle value). The angle calculator 108 outputs only the phase 110 of the extracted tap coefficient 106 to both the TDL 116 and the phase difference function generator 120.

The full length of the TDL 116 may be larger than N, (i.e., not all delays will necessarily have taps). The length of the TDL 116 must be at least D(N), which corresponds to the tap having the longest delay from the input of the TDL 116. The delay from the input of the TDL 116 to the output n (0<n<N+1) will be D(n). The TDL 116 shifts data from the input through the next delay element on a first clock tick and on to the next delay element on subsequent clock ticks. The TDL 116 operates in a similar manner as a shift register.

A vector of delays 114, D(k), comprising N delay values D(1) ... D(N), is input into the TDL 116. The TDL 116 generates N delayed samples 118, X(i−D(k)), k=1 ... N, in accordance with the vector of delays 114 and the phase 110 of the extracted tap coefficient 106. The index variable "i" is used as a time index and is suppressed in the sequel.

The phase difference function generator 120 generates N samples of an auto-correlation-like phase difference function based on each of the N delayed samples 118 output by the TDL 116 and the phase 110 output by the angle calculator 108. More specifically, N phase difference function values 122 are generated, one for each element of the vector of delays 114. The preferred function is |pi−|phase(1) −phase(n) ||, where |x|=absolute value of x, but other such functions can be used.

The averaging filter 124 averages the magnitude of the N phase difference function values 122 to generate an average phase difference function vector 126 having a plurality of elements, avg_phase_dif(k), k=1 ... N. The averaging filter 124 is essentially a bank of fixed low-pass filters, such as a moving average filter or a simple infinite impulse response (IIR) filter.

The normalizing unit 128 normalizes the elements of the average phase difference function vector 126 to generate a normalized phase difference function vector 130 having a plurality of elements. The measurements are normalized to a measured function value at a small delay. The first element in the average phase difference function vector 126 is used to divide all of the elements of the average phase difference function vector 126 to complete the normalization process. The first element in the average phase difference function vector 126 corresponds to the smallest delay in the TDL 116, which is preferably chosen such that any phase difference between the phase 110 and the first element of the N delayed samples 118 are due only to noise and not due to changes in the channel in order to compensate for random phase changes due to noise.

For example, the normalization is performed by dividing each element of the average phase difference vector 126 with the first element as follows: norm_phase_dif(k)=avg_phase_dif(k)/avg_phase_dif(1), k=1 . . . N, where avg_phase_dif is the vector of averaged phase difference function values.

Each element of the normalized phase difference function vector 130 is then compared to a threshold by a delay calculator 132 to generate a delay at a threshold. The normalized phase difference function vector 130 is a vector of decreasing numbers, (at least the first two), starting with 1.0 that correspond to samples of a curve that is also decreasing (at least near the origin).

The goal of the delay calculator 132 is to estimate the distance (in time/delay) at which the curve crosses the value equal to the threshold. If the threshold is greater than the smallest value in the normalized phase difference function vector 130, then the estimate is performed using linear interpolation. If the threshold is less than the smallest value in the normalized phase difference function vector 130, then the estimate is performed using linear extrapolation. The output 134 is the location (delay) where the curve crosses the threshold. The threshold is determined empirically based on a curve similar the one shown in FIG. 4.

The threshold delay 134 is mapped to a speed estimate 138 by the speed mapping unit 136 in accordance with a predefined mapping function. The SNR averager 145 in the step-size estimator 100 generates a CPICH SNR estimate 146 based on a CPICH SNR input 147 and sends the CPICH SNR estimate 146 to the step-size mapping unit 140. The speed estimate 138 and the CPICH SNR estimate 146 are then mapped by the step-size mapping unit 140 to the step-size, $\mu$, parameter 142 and the filter taps leakage factor, $\alpha$, parameter 144 for the equalizer tap update unit 10.

The mapping from speed and SNR is determined empirically. This is done by simulating the performance of the receiver with various values of the step-size, $\mu$ ("mu"), parameter 142, and the filter taps leakage factor, $\alpha$ ("alpha"), parameter 144 for various speeds and SNRs. At each speed and SNR value, the values of $\mu$ and $\alpha$ are determined by selecting those values which optimize performance, (e.g., lowest BER or highest throughput). Once the relation between {speed, SNR} and {$\mu$, $\alpha$} is determined for the simulated points, a more general function can be found by conventional two-dimensional (2-D) curve fitting techniques. Once the equations are established, the mapping procedure may be implemented by directly implementing the equations (or approximations of them), referring to a look up table (LUT), or both.

The filter taps leakage factor, $\alpha$, is defined as follows:

$$0 < \alpha \leq 1, \qquad \text{Equation (1)}$$

where $\alpha=1$ indicates that there is no taps leakage. When it is not desired to calculate the filter taps leakage factor, $\alpha$, (i.e., it is "optional"), $\alpha$ is just set to 1. Based on the speed estimate 138 and the CPICH SNR estimate 146, the $\mu$ parameter 142 and the $\alpha$ parameter 144 are selected.

The adaptation of the filter coefficients in a generic LMS algorithm can be written as:

$$\vec{w}_{n+1} = \alpha \cdot \vec{w}_n + \mu \cdot \vec{e}_n, \qquad \text{Equation (2)}$$

where the vector $\vec{w}_n$ represents the current value of the filter coefficients used by the equalizer tap update unit 10, $\vec{w}_{n+1}$ represents the new value of the filter coefficients used by the equalizer tap update unit 10, and the vector $\vec{e}_n$ represents the error signal that is generated as part of the LMS algorithm of the equalizer tap update unit 10. The equalizer tap update unit 10 generates the equalizer filter tap coefficients 102, which is a vector signal with L elements, where L is equal to the number of taps.

Figure 2:
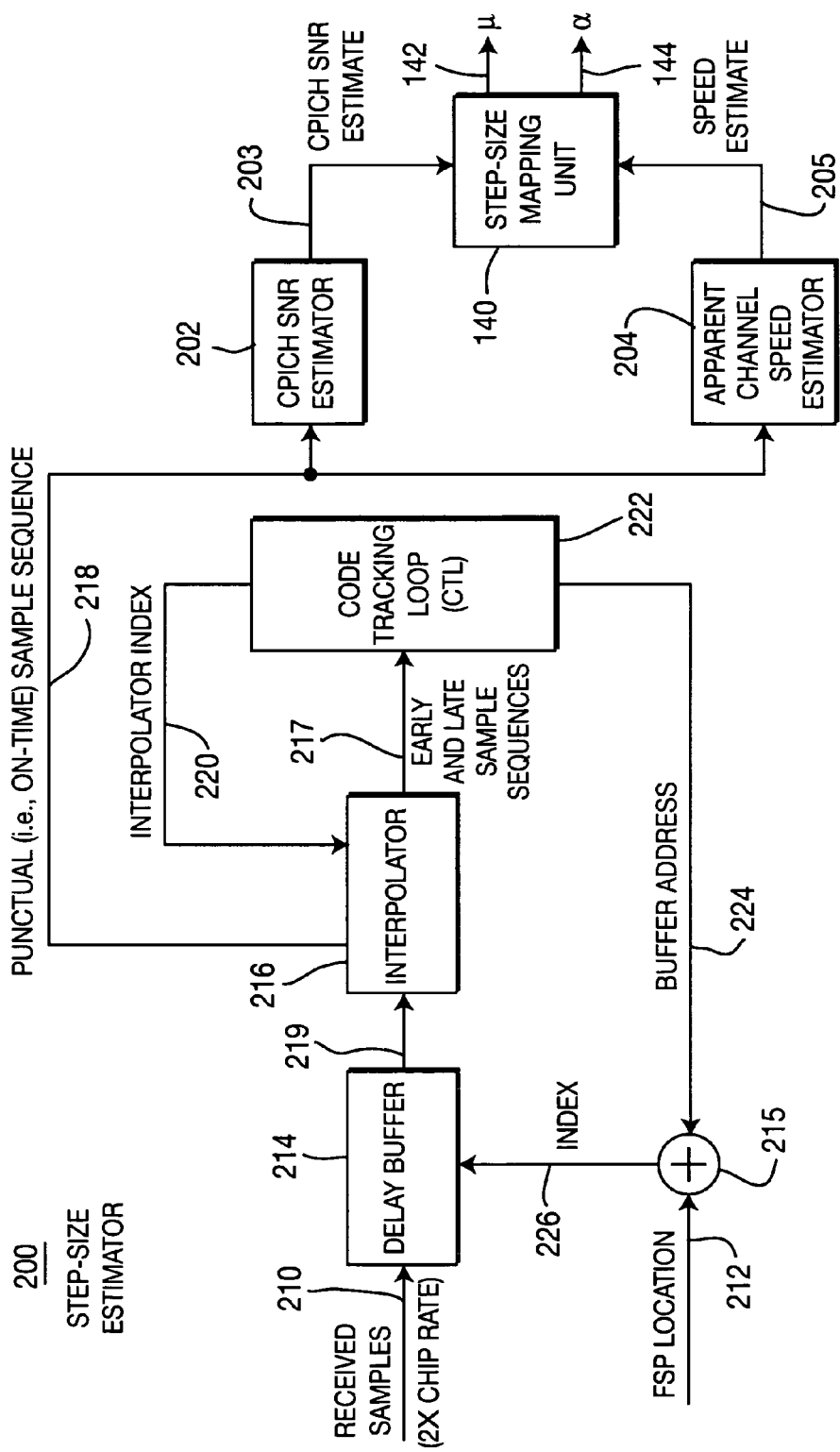
FIG. 2 is a block diagram of an exemplary step-size estimator in accordance with another embodiment of the present invention.

FIG. 2 is a block diagram of an exemplary step-size estimator 200 in accordance with another embodiment of the present invention. A step-size estimation is performed using a CPICH SNR estimate and an apparent channel speed estimate, which are mapped to the step-size $\mu$ and the filter taps leakage factor $\alpha$ based on current channel conditions. The CPICH SNR estimate and the apparent channel speed estimate can be obtained through a single path or a combination of paths, (i.e., FSP, MSP or the like).

Referring to FIG. 2, the step-size estimator 200 includes a CPICH SNR estimator 202, an apparent channel speed estimator 204, a step-size mapping unit 140, a delay buffer 214, an adder 215, an interpolator 216 and a code tracking loop (CTL) 222.

The CPICH SNR estimator 202 generates a CPICH SNR estimate 203 based on a punctual, (i.e., on-time), sample sequence 218 which is aligned with a path that is currently being tracked. The step-size estimator 200 receives samples 210 which are usually sampled at twice (2×) the main sampling rate, (i.e., chip rate). The step-size estimator 200 extracts the punctual sample sequence 218, and early and late sample sequences 217, from the received samples 210. Each extracted stream has chip rate samples.

The estimated CPICH SNR 203 is used by the mapping unit 140 for mapping to a step-size, $\mu$, parameter 142 in accordance with a predetermined mapping function. The apparent channel speed estimator 204 generates a speed estimate 205 based on the punctual sample sequence 218. The speed estimate 205 is also used by the mapping unit 140 for mapping to a filter taps leakage factor, $\alpha$, parameter 144. An exemplary configuration of the apparent channel speed estimator 204 is described below in conjunction with FIG. 3.

The received samples 210 are generated by a pulse shaping (receiver root-raised cosine (RRC)) filter output at twice the chip rate. The received samples 210 are essential for providing amplitude and phase variation information due to apparent channel speed to the step-size estimator 200. The step-size estimator 200 also receives FSP location information 212, which may be supplied by a modem that has the channel impulse response already. The step-size estimator 200 locks to a path location to estimate a corresponding apparent channel speed.

The delay buffer 214, adder 215, interpolator 216 and CTL 222 form a delay locked loop (DLL) in the step-size estimator 200 whereby the CTL 222 internally creates an error signal between the early and late sample sequences 217 of the received samples 210. The error signal in the CTL 222 drives fractional delay through the interpolator 216 so that it is forced to go to zero in average. The fractional delay includes delay in multiples of sampling rate, (i.e., integer delays with respect to sampling rate). For example, if the CTL 222 created an accumulated delay of two samples, the input data stream is delayed by 2 samples. The fractional delay provides an error amount to the interpolator 216 such that the punctual sample sequence 218 is set with zero timing offset with respect to a reference signal, (e.g., a CPICH channel in a universal mobile telecommunications system (UMTS)). The fractional delay may take any value between +/−sampling rate, e.g., −0.1, 0.2, 0.4 Tc, where Tc is the chip rate.

The early and late sample sequences 217 are correlated with a scrambling code sequence at the CTL 222. The CTL 222 generates an interpolator index signal 220 and a buffer address signal 224, (i.e., an integer multiple sample delay), based on the correlation results. An index signal 226 is generated by the adder 215 adding together a given FSP location signal 212 and the buffer address signal 224. The delay buffer 214 aligns received samples 210 for the tracked path(s), (such as an FSP), to within a certain resolution, (e.g., a chip resolution), based on the index signal 226. The delay buffer 214 must be large enough to allow for the tracking of a moving path.

The interpolator 216 receives delayed samples 219 from the delay buffer 214 and shifts the delayed samples 219 within +/−0.5 Tc with increments of +/−0.125 Tc or less. If the accumulated shift of the delayed samples 219 exceeds 0.5 Tc, (e.g., 0.625 Tc), then the interpolator 216 will perform fractional shifting by 0.125 Tc via the interpolator index signal 220 and the buffer address signal 224 is incremented by 1, (i.e., 0.5 Tc).

The interpolator 216 and the CTL 222 are used to track the FSP, an MSP or any other path(s). The punctual sample sequence 218 is generated by tracking the movement of the tracked path(s). The FSP location information 212 is tracked through the CTL 222 by delaying the received samples 210 via the delay buffer 214, (i.e., integer adjustments), and/or advancing the received samples 210 via the interpolator 216, (i.e., fractional adjustments). The interpolator 216 receives an interpolator index signal 220 from the CTL 222, and generates the punctual sample sequence 218 and early and late sample sequences 217. The CTL 222 creates a fractional error which is mapped into indices that point to predefined interpolator weights (coefficients) that control fractional delaying and/or advance the received samples 210 from the CTL 222 for fractional sample delay.

The size of the delay buffer 214 is a function of the timing drift and the FSP update rate. Timing drift is the movement caused by frequency offset between the base station and the WTRU. The apparent channel speed also causes frequency offset. Therefore, the path appears to be moving. For example, the modem has the synchronization information for a base station and knowledge of a channel impulse response (path locations), and sets the CTL 222 with a path location, (i.e., started sampling with respect to given FSP location information 212). If there is a movement on the given path, the CTL 222 follows it until exceeding the buffer limits for multiple sample delays or advances. However, if the FSP location information is timely updated before the CTL 222 hits the buffer boundary, the CTL 222 will be able to follow the path without difficulty.

Figure 3:
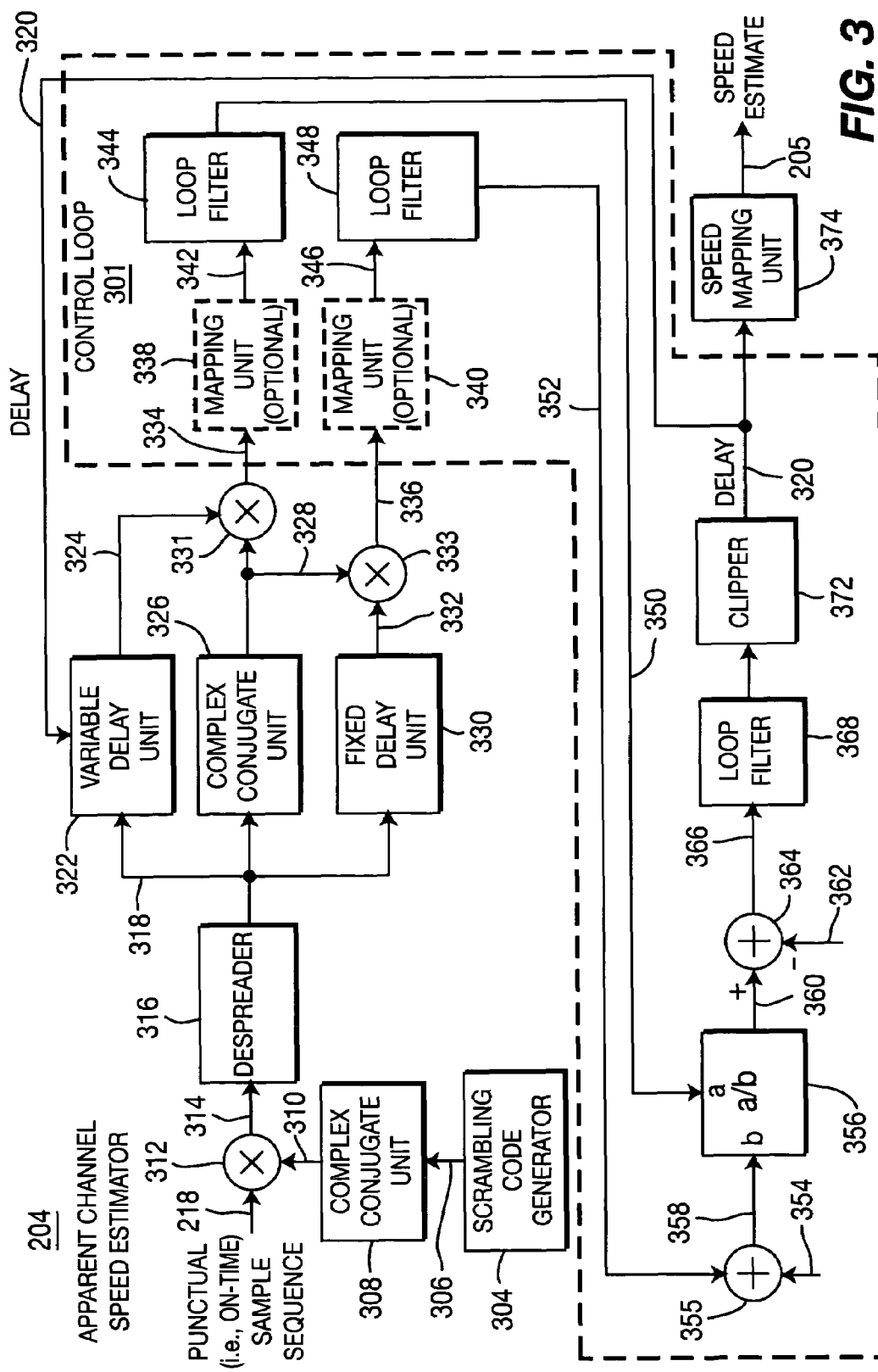
FIG. 3 is a block diagram of an exemplary apparent channel speed estimator used in the size step estimator of FIG. 2.

FIG. 3 is a block diagram of an exemplary apparent channel speed estimator 204 used in the step-size estimator 200 of FIG. 2. The apparent channel speed estimator 204 includes a control loop 301, a scrambling code generator 304, complex conjugate units 308, 326, multipliers 312, 331, 333, a despreader 316, a variable delay unit 322, a fixed delay unit 330 and a speed mapping unit 374.

In accordance with this embodiment, the amount of delay required between a current symbol and delayed symbols to achieve a target phase in the delay buffer 214 of the size step estimator 200 of FIG. 2 is estimated through a control loop 301. The control loop 301 generates a delay value 320 as a function of velocity. The delay value 320 is then mapped to a speed by the speed mapping unit 374.

The punctual, (i.e., on-time), sample sequence 218 from the step-size estimator 200 of FIG. 2 is fed to a first input of the multiplier 312. The scrambling code generator 304 generates a scrambling code 306 which is fed to the complex conjugate unit 308. The complex conjugate unit 308 then generates a scrambling code conjugate 310 which is fed to a second input of the multiplier 312. The punctual sample sequence 218 is multiplied with the scrambling code conjugate 310 to generate a descrambled sample sequence 314. The descrambled sample sequence 314 is despread by the despreader 316 and a symbol sequence 318 is generated thereafter.

The symbol sequence 318 is input to the variable delay unit 322, the complex conjugate unit 326 and the fixed delay unit 330. The complex conjugate unit 326 generates a complex conjugate 328 of a current symbol. The variable delay unit 322 delays the symbol sequence 318 in accordance with a delay value 320 and generates a first delayed symbol sequence 324. The fixed delay unit 330 delays the symbol sequence by the duration of one symbol and generates a second delayed symbol sequence 332.

The complex conjugate 328 of the current symbol is multiplied with the first delayed symbol sequence 324 by the multiplier 331 to generate a first delayed conjugate signal 334. The complex conjugate 328 of the current symbol is also multiplied with the second delayed symbol sequence 332 by the multiplier 333 to generate a second delayed conjugate signal 336.

The control loop 301 includes optional mapping units 338, 340, control loops 344, 348, 368, adders 355, 364, a divider 356 and a clipper 372. The control loop 301 outputs the delay value 320 based on the first and second delayed conjugate signals 334, 336, the real parts of which are optionally mapped to mapped values 342, 346, (+1 or −1), by the optional mapping units 338, 340. The delayed conjugate signal 334 is the auto-correlation output based on a variable delay value 324. The delayed conjugate signal 336 is the auto-correlation value with respect to one symbol delay 332. The signals 334 and 336 are optionally mapped by the mapping units 338, 340 and then smoothed by the loop filters 344, 348 before normalization occurs.

The normalization process is a necessity in any case to ensure repeatability for the speed in different signal to noise ratios. The filtered conjugate signal 350 in FIG. 3 may not provide values between 0 and 1 if normalization is not performed. If the mapping units 338, 340 are not used, the delayed conjugate signals 334, 336 are directly filtered by the loop filters 344, 348.

Figure 4:
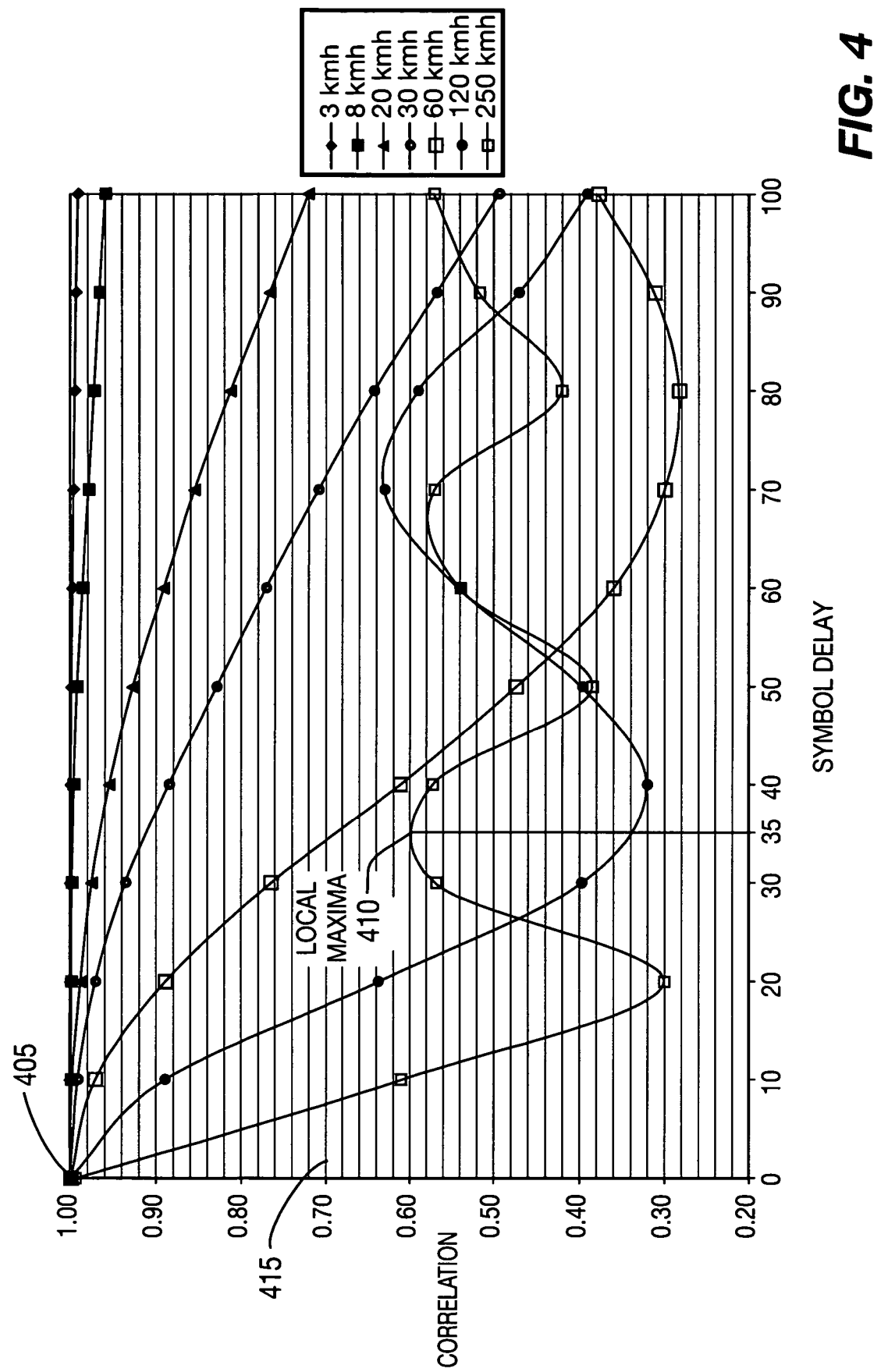
FIG. 4 shows an example of a graphical relationship of symbol delay versus correlation at different speeds for the apparent channel speed estimator of FIG. 3.
Figure 5:
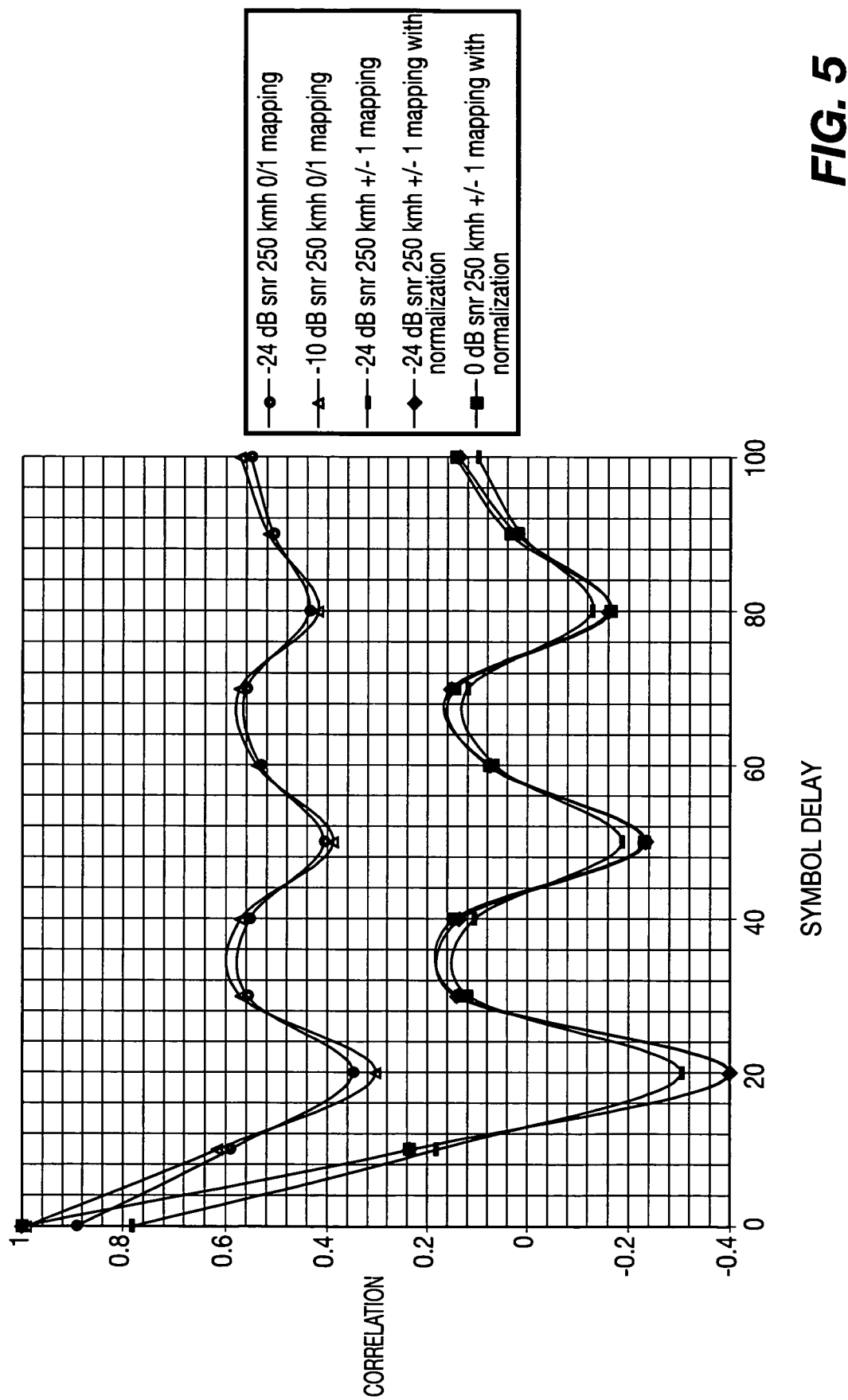
FIG. 5 shows an example of a graphical relationship of symbol delay versus correlation at different SNRs for the apparent channel speed estimator of FIG. 3.

The resulting normalization values range from 0 to 1. The minimum delay 320 that can be applied to the variable delay unit 322 of FIG. 3 is always larger than one symbol delay, which is the exact delay of the fixed delay unit 330. Therefore, the normalization yields values ranging between 0 and 1. A reference level value may be determined based on the value of quotient result signal 360. The underlying process will create the response for the quotient result signal 360 in FIG. 3, as depicted in FIGS. 4 and 5. The filtered conjugate signal 350 generated by the loop filter 344 is fed to a first input of the divider 356. The filtered conjugate signal 352 generated by the loop filter 348 is fed to a second input of the divider 356 via the adder 355, which adds a small constant value 354 to avoid division by zero to generate a sum result signal 358. The divider 356 divides the filtered conjugate signal 350 by the sum result signal 358 to generate a quotient result signal 360. This is a normalization process used to prevent variations due to SNR settings.

Since the correlations are performed by using a known sequence, (i.e., CPICH signal), the SNR level of the correlated signal will have direct impact on the calculated correlations. A reference/correlation value signal 362 is subtracted from the quotient result signal 360 by the adder 364.

The normalization forces the quotient result signal 360 to range between 0 and 1 when the mapping in 338 and 340 creates 0 or 1 as depicted in FIG. 4 and partially in FIG. 5. If the mapping of 0 and 1 considered that the minimal hardware to be implemented, the reference level of 0.7 would be the best value according to FIG. 4 since the curves create values that are always less than 0.7. When mapping generates +1 and −1, then a reference value that is smaller can be used instead of 0.7. However, using for example 0.4 for mapping of +1 and −1 requires more hardware in 322 of FIG. 3 and the speed mapping unit 374 must be updated for each different reference level. Thus, the value 0.7 is a better value for both mappings to generate a difference result signal 366 which is fed through the loop filter 368 and the clipper 372 to generate the delay value 320.

The loop filter 368 is used to reduce the noise impact in the control loop 301. The clipping by clipper 372 is reasonable since there is no need to estimate speed above 250 kmh and below 3 kmh. Also, clipping may reduce the hardware size of the speed mapping unit 374. The reference/correlation value 362 is a target value that the control loop 301 is attempting to converge to.

FIG. 4 shows an example of a graphical relationship of symbol delay versus correlation at different speeds for the apparent channel speed estimator 204 of FIG. 3. The correlation value in FIG. 4 corresponds to quotient result signal 360 of FIG. 3 with no noise simulations. As indicated in FIG. 4, the auto-correlation curves for higher speeds cross a reference level, 0.7, with smaller delay, and the slower speed curves pass the reference with larger delays. The goal is to get zero mean value for the difference result signal 366 in FIG. 3 when the proper delay is created at the delay 320. To ensure a zero mean value and make the control loop 301 converge, the reference 415, (i.e., 0.7 correlation), must be subtracted.

Therefore, the speed is inversely proportional to the delay amount to set the normalized auto-correlation to the reference level 415. The symbol delay required to achieve a 0.7 normalized auto-correlation value is inverted first, and then multiplied by a factor to generate the speed estimate 205.

The control loop 301 of the apparent channel speed estimator 204 of FIG. 3 must not settle to a local maxima. For example, for the 250 kmh curve shown in FIG. 4, the maximum value 405 is 1.0 with the minimum symbol delay. Also, the same curve periodically has local maximum and minimum values, (e.g., the value 0.6 is a local maxima 410 at a symbol delay value of 35). Due to very high noise and/or interference level, if the first estimated delay 320 shown in FIG. 3 has a symbol delay that is close to a value of 35 for 250 kmh, as shown in FIG. 4, then the loop settles to the symbol delay value of 35 and estimates a slower speed at 60 kmh than at 250 kmh. The reference/correlation value 362 is chosen such that the speed related auto-correlation curves of FIG. 4 do not pass the reference level of 0.7 in multiple delay points. The delay value 320 is mapped to a speed estimate 205 by the speed mapping unit 374 in accordance with a predefined mapping function.

The present invention is based on the fact that the autocorrelation function for the Doppler spectrum is a 0th order Bessel function. The Bessel behavior permits a correlation value to be set to estimate the amount of delay to achieve desired correlation between a current symbol and delayed symbol. As shown in FIG. 4, the correlation between symbols generally decreases as the delay value increases and the speed of the WTRU increases. By forcing the correlation between the symbols separated by the delay value to converge to the target value, the delay amount can be mapped to a speed by a predetermined mapping function. The target value is set around 0.7 which is higher than the local peaks on the graph. Mapping function can be defined since after the control loop 301 reaches a convergence, the delay value at the convergence can be mapped to a corresponding speed as shown in FIG. 4.

The optional mapping units 338 and 340 of FIG. 3 may use a mapping of 0 and 1, or +/−1. FIG. 4 illustrates a mapping of 0 and 1.

FIG. 5 shows an example of a graphical relationship of symbol delay versus correlation at different SNRs for the apparent channel speed estimator 204 of FIG. 3. The correlation value in FIG. 5 corresponds to the quotient result signal 360, the difference between the reference/correlation value 362 and the local peak of the auto-correlation value of the underlying process. For example, the delta for mapping of 0 or 1 has 0.7−0.6=0.1 at delay of 35 symbols; and for the mapping of +/−1 the delta becomes 0.7−0.2=0.5 which has greater immunity against the noise fluctuations.

While the present invention has been described in terms of the preferred embodiment, other variations which are within the scope of the invention as outlined in the claims below will be apparent to those skilled in the art.

What is claimed is:

1. A step-size estimator for controlling the step-size of an adaptive equalizer having an equalizer tap update unit, the step-size estimator comprising:
 a speed estimator for estimating the apparent speed of a channel; and
 a step-size mapping unit for mapping the estimated apparent speed to at least one parameter used by the adaptive equalizer to update at least one filter tap coefficient used by the adaptive equalizer, wherein the speed estimator comprises:
 a tap coefficient extractor for extracting at least one equalizer filter tap coefficient from filter tap coefficients generated by the equalizer tap update unit;
 an angle calculator for generating a phase of the extracted equalizer filter tap coefficient;
 a tapped delay line (TDL) for generating N delayed samples based on a vector of N delay values and the phase of the extracted equalizer filter tap coefficient;
 a phase difference function generator for generating N phase difference function values based on the N delayed samples and the phase of the extracted equalizer filter tap coefficient;
 an averaging filter for averaging the magnitude of the phase difference function values to generate an average phase difference vector having a plurality of elements;
 a normalizing unit for normalizing the elements of the averaged phase difference vector to generate a normalized phase difference function vector having a plurality of elements;
 a delay calculator for comparing each element of the normalized phase difference function vector to a threshold to generate a delay at the threshold; and
 a speed mapping unit for mapping the delay at the threshold to the speed estimate.

2. The step-size estimator of claim 1 wherein the speed estimator measures the apparent speed based on a Doppler spectrum of the channel impulse response.

3. The step-size estimator of claim 1 further comprising:
a signal-to-noise ratio (SNR) averager for generating a common pilot channel (CPICH) SNR estimate, wherein the step-size mapping unit uses the apparent speed estimate and the CPICH SNR estimate to generate the at least one parameter.

4. The step-size estimator of claim 3 wherein the at least one parameter includes a step-size parameter $\mu$.

5. The step-size estimator of claim 4 wherein the at least one parameter further includes a filter taps leakage factor parameter $\alpha$.

6. The step-size estimator of claim 5 wherein the adaptive equalizer is incorporated in a first transceiver, at least one filter tap coefficient used by the adaptive equalizer is updated based on an apparent speed of a channel established between the first transceiver and a second transceiver, and the equalizer tap update unit generates filter tap coefficients based on the algorithm $\vec{w}_{n+1} = \alpha \cdot \vec{w}_n + \mu \cdot \vec{e}_n$, wherein the vector $\vec{w}_n$ represents the current value of the filter coefficients used by the adaptive equalizer, the $\vec{w}_{n+1}$ represent the new value, and the vector $\vec{e}_n$ represents the error signal that is generated by the equalizer tap update unit.

7. The step-size estimator of claim 6 wherein the apparent speed is based on movement of the first transceiver.

8. The step-size estimator of claim 6 wherein the apparent speed is based on movement of the second transceiver.

9. The step-size estimator of claim 6 wherein the apparent speed is based on the environment in which at least one of the first and second transceivers operate.

10. The step-size estimator of claim 6 wherein the apparent speed is based on changes due to oscillator errors which occur in at least one of the first and second transceivers.

11. The step-size estimator of claim 6 wherein the apparent speed is based on at least one of movement of the first transceiver, movement of the second transceiver, the movement of objects in the environment in which at least one of the first and second transceivers operate, and oscillator errors which occur in at least one of the first and second transceivers.

12. The step-size estimator of claim 6 wherein the delay at the threshold is performed using linear interpolation if the threshold is greater that the smallest value in the normalized phase difference function vector.

13. The step-size estimator of claim 6 wherein the delay at the threshold is performed using linear extrapolation if the threshold is less that the smallest value in the normalized phase difference function vector.

14. The step-size estimator of claim 6 wherein the filter tap coefficients are generated by the equalizer tap update unit in the form of a vector signal with L elements, where L is equal to the number of taps.

15. The step-size estimator of claim 6 wherein the first transceiver is a wireless transmit/receive unit (WTRU) which moves a various speeds.

16. The step-size estimator of claim 6 wherein the second transceiver is a wireless transmit/receive unit (WTRU) which moves a various speeds.

17. A method of controlling the step-size of an adaptive equalizer having an equalizer tap update unit, the method comprising:

estimating the apparent speed of the channel by:
extracting at least one equalizer filter tap coefficient from the filter tap coefficients generated by the equalizer tap update unit;
generating a phase of the extracted equalizer filter tap coefficient;
generating N delayed samples based on a vector of N delay values and the phase of the extracted equalizer filter tap coefficient;
generating N phase difference function values based on the N delayed samples and the phase of the extracted equalizer filter tap coefficient;
averaging the magnitude of the phase difference function values to generate an average phase difference vector having a plurality of elements;
normalizing the elements of the averaged phase difference vector to generate a normalized phase difference function vector having a plurality of elements;
comparing each element of the normalized phase difference function vector to a threshold to generate a delay at the threshold; and
mapping the delay at the threshold to the speed estimate; and
mapping the estimated apparent speed to at least one parameter used by the adaptive equalizer to update the filter tap coefficient.

18. The method of claim 17 wherein the apparent speed is measured based on a Doppler spectrum of the channel impulse response.

19. The method of claim 17 further comprising:
generating a common pilot channel (CPICH) SNR estimate; and
using the apparent speed estimate and the CPICH SNR estimate to generate the at least one parameter.

20. The method of claim 19 wherein the at least one parameter includes a step-size parameter $\mu$.

21. The method of claim 20 wherein the at least one parameter further includes a filter taps leakage factor parameter $\alpha$.

22. The method of claim 21 wherein the adaptive equalizer is incorporated in a first transceiver, and at least one filter tap coefficient used by the adaptive equalizer is undated based on an apparent speed of a channel established between the first transceiver and a second transceiver, the method further comprising:
generating filter tap coefficients based on the algorithm $\vec{w}_{n+1} = \alpha \cdot \vec{w}_n + \mu \vec{e}_n$, wherein the vector $\vec{w}_n$ represents the current value of the filter coefficients used by the adaptive equalizer, the $\vec{w}_{n+1}$ represent the new value, and the vector $\vec{e}_n$ represents an error signal.

23. The method of claim 22 wherein the apparent speed is based on movement of the first transceiver.

24. The method of claim 22 wherein the apparent speed is based on movement of the second transceiver.

25. The method of claim 22 wherein the apparent speed is based on the environment in which at least one of the first and second transceivers operate.

26. The method of claim 22 wherein the apparent speed is based on changes due to oscillator errors which occur in at least one of the first and second transceivers.

27. The method of claim 22 wherein the apparent speed is based on at least one of movement of the first transceiver, movement of the second transceiver, the movement of objects in the environment in which at least one of the first and second transceivers operate, and oscillator errors which occur in at least one of the first and second transceivers.

28. The method of claim 22 wherein the delay at the threshold is performed using linear interpolation if the threshold is greater that the smallest value in the normalized phase difference function vector.

29. The method of claim 22 wherein the delay at the threshold is performed using linear extrapolation if the threshold is less that the smallest value in the normalized phase difference function vector.

30. The method of claim 22 wherein the filter tap coefficients are generated in the form of a vector signal with L elements, where L is equal to the number of taps.

31. The method of claim 22 wherein the first transceiver is a wireless transmit/receive unit (WTRU) which moves a various speeds.

32. The method of claim 22 wherein the second transceiver is a wireless transmit/receive unit (WTRU) which moves a various speeds.

* * * * *

UNITED STATES PATENT AND TRADEMARK OFFICE
CERTIFICATE OF CORRECTION

PATENT NO. : 7,496,138 B2
APPLICATION NO. : 11/238469
DATED : February 24, 2009
INVENTOR(S) : Peitraski et al.

It is certified that error appears in the above-identified patent and that said Letters Patent is hereby corrected as shown below:

At column 5, line 35, after the word "similar" insert --to--.

At claim 12, column 11, line 48, after the word "greater" delete "that" and insert therefor --than--.

At claim 13, column 11, line 52, after the words "is less" delete "that" and insert therefor --than--.

At claim 15, column 11, line 60, after the word "moves" delete "a" and insert therefor --at--.

At claim 16, column 11, line 64, after the word "moves" delete "a" and insert therefor --at--.

At claim 22, column 12, line 49, before the word "wherein" delete

" $\vec{w}_{n+1} = \alpha \cdot \vec{w}_n + \mu \vec{e}_n,$ " and insert therefor -- $\vec{w}_{n+1} = \alpha \cdot \vec{w}_n + \mu \cdot \vec{e}_n,$ --.

At claim 28, column 13, line 5, after the word "greater" delete "that" and insert therefor --than--.

At claim 29, column 13, line 9, after the word "less" delete "that" and insert therefor --than--.

At claim 31, column 14, line 5, after the word "moves" delete "a" and insert therefor --at--.

UNITED STATES PATENT AND TRADEMARK OFFICE
CERTIFICATE OF CORRECTION

PATENT NO. : 7,496,138 B2
APPLICATION NO. : 11/238469
DATED : February 24, 2009
INVENTOR(S) : Peitraski et al.

It is certified that error appears in the above-identified patent and that said Letters Patent is hereby corrected as shown below:

At claim 32, column 14, line 8, after the word "moves" delete "a" and insert therefor --at--.

Signed and Sealed this

Twenty-sixth Day of May, 2009

JOHN DOLL
*Acting Director of the United States Patent and Trademark Office*